S. A. DOBYNE.
EDGE SETTING MACHINE.
APPLICATION FILED NOV. 29, 1915.
1,207,879.
Patented Dec. 12, 1916.
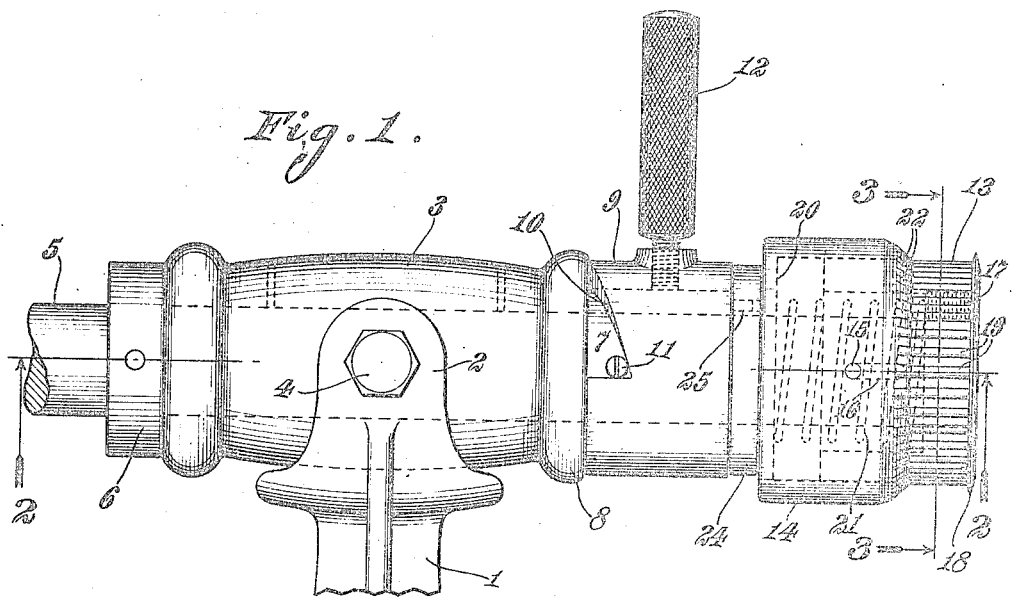
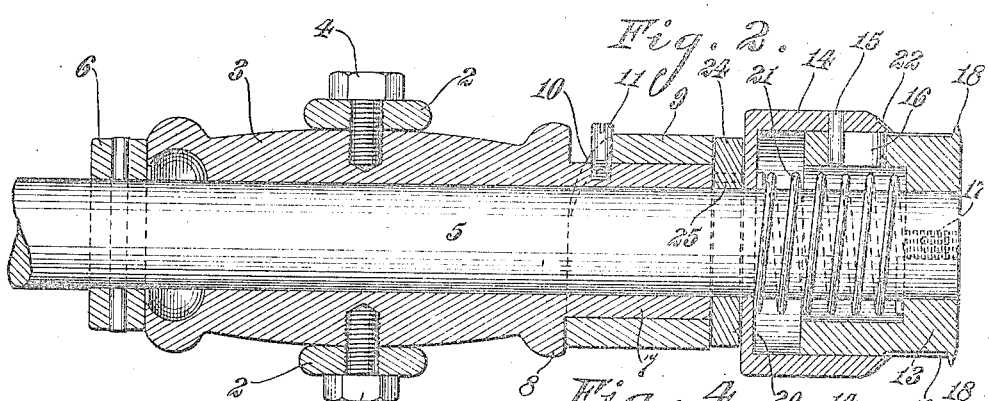
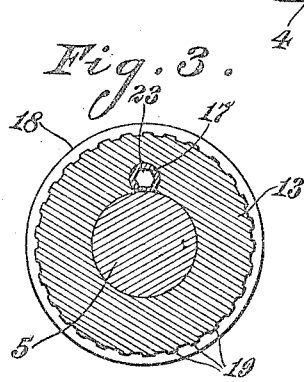
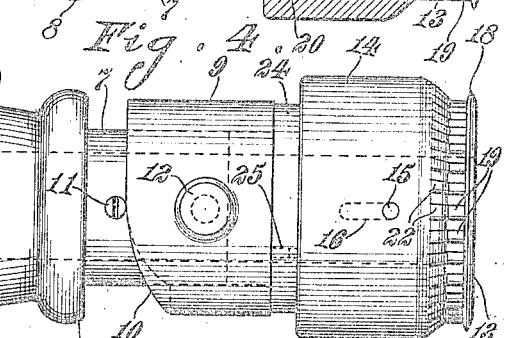
Inventor:
STEPHEN A. DOBYNE,
By John N. Bruninger
His Attorney.

UNITED STATES PATENT OFFICE.

STEPHEN A. DOBYNE, OF ST. LOUIS, MISSOURI, ASSIGNOR TO CHAMPION SHOE MACHINERY COMPANY, OF ST. LOUIS, MISSOURI, A CORPORATION OF MISSOURI.

EDGE-SETTING MACHINE.

1,207,879.  Specification of Letters Patent.  Patented Dec. 12, 1916.

Application filed November 29, 1915. Serial No. 64,011.

*To all whom it may concern:*

Be it known that I, STEPHEN A. DOBYNE, a citizen of the United States, and residing at St. Louis, in the State of Missouri, have invented a certain new and useful Improvement in Edge-Setting Machines, of which the following is a specification.

This invention relates to edge setters, such as are employed for setting and burnishing the edges of shoe soles, and is especially adaptable for repair work. The operation of such devices, as now on the market, involves equipping the machines with a comparatively large number of interchangeable setter heads or tools in order to properly meet the exigencies arising from the varying thicknesses of the soles to be operated upon and which range anywhere from an eighth to three-quarters of an inch in thickness. Such an equipment is not only expensive, but in practice, results in considerable loss of time incident to interchanging the setter heads for the soles of different thicknesses. Furthermore, a highly unsatisfactory condition encountered, under the prior method, was the impracticability of accurately fitting the setting head or tool to the sole being operated upon, with the resultant liability of rounding the sole edge while under treatment.

The present invention has among its objects, therefore, to provide for the replacement of the group of interchangeable setter heads as heretofore employed, by a single comparatively simple inexpensive head or tool which may be readily adjusted to soles of different thicknesses and which, when so adjusted, will accurately fit the particular sole and effectually prevent rounding of the sole edge.

Further objects of the invention are to provide for readily and securely locking the parts of the head or tool in its various adjusted positions, and to so secure the tool upon its operating shaft that it may be readily removed, at will, for cleaning or other purposes.

These heads must be heated in order that they may properly burnish the sole edges, and the simplest method of accomplishing this is to employ a friction element to be held in contact with the head, it having been the practice heretofore, to hold such an element in constant engagement with the head, resulting in the latter being continuously heated when in motion. Now when these setter heads are employed for repair work, they are usually mounted upon a power driven shaft together with a number of other tools or devices comprised in a repair outfit, and as the one shaft operates all of the units of the outfit, it follows that the setter head is actually used during only a part of the time that it is being driven by the shaft, and consequently, a continuous heating of the head, whenever it is in motion, is unnecessary and results merely in a needless waste of energy and a useless destructive wearing of the parts.

Further objects of the invention, therefore, are to provide for readily and effectually heating the setting head only when needful to effect burnishing and when in actual operation upon the shoe sole, and to bring the heating element into play simultaneously with the setting of the head for operation upon the shoe sole.

With the above and other objects in view, the invention comprises the novel features of construction and combination of parts more fully hereinafter described.

In the accompanying drawings, Figure 1 is a side elevation of a sole edge setter embodying the invention showing the same mounted for use; Fig. 2 is a horizontal section taken longitudinally through the device on the line 2—2 of Fig. 1; Fig. 3 is a detail sectional view taken on the line 3—3 of Fig. 1; and Fig. 4 is a detail view, in elevation of the head showing the same adjusted for operation on a thin sole.

Referring to the drawings 1 designates a portion of a supporting or frame standard, having its upper end bifurcated to provide jaws 2 spaced to receive a tubular bearing 3 properly secured in place by bolts 4 and adapted to receive a shaft 5, which in practice may have fixed thereon a number of tools or devices comprised in a shoe repairing outfit, and may be driven from any suitable source of power, there being pinned to the shaft a suitable stop collar 6 disposed to contact with the inner end of the bearing 3 and hold the shaft against endwise movement or play. It is to be understood that in practice there will be two of the standards 1 arising from the framework of the machine and two of the bearings 3 carried respectively by said standards and in which the shaft is journaled, but that while this is described as a preferred form of mounting the shaft, the same may be mounted or hung in any appropriate manner.

Provided at the outer or forward end of the bearing is a reduced portion or hub 7 provided at its inner end with an annular shoulder 8, there being loosely mounted upon the hub 7, a cam member or sleeve 9 having its inner edge, which normally bears against the shoulder 8, suitably recessed to provide an inclined cam face 10 adapted, upon rotation of the sleeve in one direction, to ride against a fixed stop 11, in the form of a screw pin tapped into the hub 7, for advancing the sleeve forwardly on the hub and relatively to the bearing, for a purpose which will hereinafter appear. The sleeve 9 is equipped with a radially projecting operating handle or finger piece 12, preferably of the form shown, provided at its inner end with a reduced shank threaded through a reinforcing boss suitably formed on the sleeve 9 and for terminal engagement with the hub 7 to clamp the sleeve against rotation. The part 12 thus not only serves as an operating handle for turning the sleeve, but also as a locking means for fixedly holding the sleeve against movement, it being understood that by turning the part 12 slightly in one direction the sleeve will be released for rotation and is, thereafter, locked by giving the part a slight turn in the reverse direction, the said part being, for convenience in manipulation, provided with a milled surface as shown.

Mounted on the end of the shaft 5 is an edge setting head consisting of a main fixed body portion or section 13 and an auxiliary adjustable portion or section 14, the latter being in the form of a tubular sleeve telescopically disposed on the inner end of the body or head proper 13 and held for longitudinal sliding movement upon, and rotation with said body, by means of a pin and slot connection 15—16. The main section or head 13, which is held removably fixed on the shaft by means of a rotary locking spline 17, is provided at its outer end with a peripheral bead or flange 18 and, upon the active portion of its surface with a series of longitudinal ribs 19 extending in spaced parallel relation around the periphery of the head, while the adjustable sleeve 14 is provided with an inner end wall or flange 20, forming a bearing for one end of a compressible spring 21 having bearing at its other end against the head-section 13, and serving to hold the section 14 normally retracted with respect to the section 13, as seen in Figs. 1 and 2. The forward edge of the sleeve 14 is beveled as shown, and provided with radial ribs 22 corresponding with and forming, in effect, continuations of the ribs 19. The spline 17 which is rotatably mounted in a longitudinal socket, suitably formed in the head-section 13, is eccentrically arranged and is provided with a key socket 23, adapted to receive a suitable key for turning the spline to secure the head removably on the shaft.

Interposed between the forward edge of the cam-sleeve 9 and the end wall 20 of the head-section 14, is a friction element or disk 24, composed of any suitable material but preferably of some hard wood such as maple, this disk, which is normally free from contact with the head-section 14, being loose on the shaft and held against rotation, by means of a pin 25 projecting forwardly from the hub 7 and entering an aperture formed in the disk.

In practice the shaft 5 carrying the head 13—14 is set in motion and the shoe to be operated upon is held with the marginal edge of the sole resting squarely upon the ribbed surface of the head-section 13, and the outer head-flange 18 in the crease and bearing upon the upper or welt face of the sole. The handle 12 is then turned to release the cam-sleeve 9 which may now be rotated by a forward pull on said handle, thereby causing the inclined cam face 10 to ride over the fixed part 11 and advance the sleeve bodily and longitudinally toward the head-section 14, whereby the said section is, in turn, advanced longitudinally over the section 13 for bringing the chamfered edge 22 of the adjustable section to bear upon the lower or bottom face of the sole edge, it being understood that the amount of movement thus imparted to the section 14 will be determined by the thickness of the sole being operated upon, and by an adjustment of the head-section 14 which will adapt the sole to fit edgewise snugly between the chamfered faces presented by the flange 18 and face 22 of the respective head-sections 13 and 14. As the section 14 is thus advanced by the cam-sleeve 9, the friction disk 24, which is mounted for movement longitudinally of the shaft 5, is simultaneously forced forwardly against the inner wall 20 of the now rapidly rotating head-section 14 and the frictional action of the disk upon said wall causes the head to become rapidly and thoroughly heated as will be readily understood. At this point it is to be noted that ordinarily, and when the parts are in their normal positions, as in Figs. 1 and 2, the disk 24 lies out of frictional contact with the head 13—14, and that under such conditions, the shaft 5 may be set in motion for bringing into action others of the set of tools or devices comprised in the repair outfit, without effecting heating of the setter head, and thus, the friction element 24 will be brought into play for heating the head only during the time when the latter is in actual use.

After the cam-sleeve 9 has been manipulated, as above explained, for adjusting the head to the thickness of the sole, and for throwing the friction disk 24 into action it may be securely locked in place by giving the handle 12 a slight turn to the right, whereby the parts remain secured in proper position while the sole setting operation progresses, and the operator is given free use of both hands in handling the work. During the above adjustment of the parts, the spring 21 will be compressed more or less between the head sections 13 and 14 and will, therefore, when the sleeve 9 is released, at the completion of the setting operation, automatically return the several parts to their normal positions.

It may be mentioned that while the sole edge is being acted upon, the roughened or ribbed surface 19 of the head serves to rapidly cut or rub off the nap raised in the operation of trimming the sole edge and, therefore, effects a rapid smoothing and polishing of the sole edge, while at the same time the flange 18 and edge 22 act respectively for slightly beveling and polishing the upper and lower faces of the sole at its edges.

It is apparent that under this invention there is produced an edge setter which effectually accomplishes its stated objects and in attaining these ends it is to be understood that the invention is not necessarily restricted to the details herein set forth as various changes may be made therein without departing from the spirit or scope of the invention.

Having thus described the invention what is claimed is:

1. In a machine of the class described, a setter head having a relatively movable section arranged for adjustment to adapt the head to work of different thicknesses, and a rotatable sleeve and means coöperating therewith, constructed and arranged upon rotation of said sleeve to shift said section.

2. In a machine of the class described, a setter head having a relatively movable section arranged for adjustment to adapt the head to work of different thicknesses, a rotatable sleeve and means coöperating therewith, constructed and arranged upon rotation of said sleeve to shift said section, and means for locking the sleeve against movement.

3. In a machine of the class described, a setter head having an adjustable section arranged for movement to adapt the head to work of different thicknesses, a rotatable sleeve and means coöperating therewith, constructed and arranged upon rotation of said sleeve to move said section in one direction, and a spring arranged for moving said section in the other direction.

4. In a machine of the class described, a setter head having a relatively movable section adjustable to adapt the head to work of different thicknesses, a rotary sleeve operatively arranged for movement to effect adjustment of said section, said sleeve having a cam face, and a stop disposed for engagement with said cam face and for coöperation therewith during rotation of the sleeve for actuating the latter to adjust said section.

5. In a machine of the class described, a setter head adjustable to work of different thicknesses, and head adjusting means including an element movable in one relation to operate said means to adjust said head and movable in another relation to lock said head in adjusted position.

6. In a machine of the class described, a setter head adjustable to work of different thicknesses, means for adjusting said head, and an operating member connected with said adjusting means and movable in one relation to move said adjusting means and movable in another relation to lock said adjusting means.

7. In a machine of the class described, a setter head adjustable to work of different thicknesses, a friction element operative for heating said head, and means for adjusting said head and simultaneously bringing said element into action.

8. In a machine of the class described, a setter head having a relatively movable section arranged for adjustment to adapt the head to work of different thicknesses, a normally inactive friction element operative for heating said head, and means for simultaneously adjusting said section and bringing said element into action.

9. In a machine of the class described, a setter head having a relatively movable section arranged for adjustment to adapt the head to work of different thicknesses, a normally inactive friction element operative for heating said head, means for simultaneously adjusting said section and bringing said element into action, and means for locking said parts against movement.

10. In a machine of the class described, a setter head having a relatively movable section arranged for adjustment to adapt the head to work of different thicknesses, a normally inactive friction element operative for heating said head, a sleeve operatively arranged for actuating said section and for simultaneously bringing said element into action, and means for locking said sleeve against movement.

11. In a machine of the class described, a setter head adjustable to work of different thicknesses, a normally inactive friction element operative for heating said head, and a common means for adjusting said head and for bringing said element into action.

12. In a machine of the class described, a setter head, means for heating said head, said head and heating means being normally inoperative, and means for concurrently rendering said setter head and said heating means operative.

13. In a machine of the class described, a setter head, normally inoperative means for heating said head, and means for setting said head to operate on the work and for concurrently rendering said heating means operative to heat said head.

14. In a machine of the class described, a setter head adjustable to work of different thicknesses, normally inoperative means for heating said head, and means for adjusting said head to the thickness of the work and for concurrently rendering said heating means operative to heat said head.

In testimony whereof I affix my signature this 11th day of September, 1915.

STEPHEN A. DOBYNE.